United States Patent [19]
Matchell
[11] 3,814,850
[45] June 4, 1974

[54] FLYING SPOT FILM SCANNER PROVIDING INCREASED TIME FOR FILM PULL-DOWN

[75] Inventor: Raymond Matchell, Ongar, England
[73] Assignee: The Rank Organization Limited, London, England

[22] Filed: Oct. 27, 1972
[21] Appl. No.: 301,278

[30] Foreign Application Priority Data
Oct. 27, 1971 Great Britain .................... 49890/71

[52] U.S. Cl. ........................... 178/7.2, 178/DIG. 28
[51] Int. Cl. ............................................ H04n 5/36
[58] Field of Search ....................... 178/7.2, DIG. 28

[56] References Cited
FOREIGN PATENTS OR APPLICATIONS
1,232,133 5/1971 Great Britain .............. 178/DIG. 28
2,062,644 6/1971 Germany ..................... 178/DIG. 28

*Primary Examiner*—Robert L. Richardson
*Attorney, Agent, or Firm*—Brisebois & Kruger

[57] ABSTRACT

A flying spot scanner for producing a television video signal from a motion picture film in which a period of time longer than the blanking interval between successive fields is available for film pull-down. The longer interval for film pull down is provided by delaying the production of the first field scan of each frame via a delay line, by an amount no greater than the field blanking interval, initiating the second field scan of each frame during a time interval immediately following the first field scan and of a duration less than the normal blanking interval between frames. The pulling down or advancing of the film one frame is done during the longer than blanking interval period of time between the second field scan of one frame and the first field scan of an immediately following frame. The delay can be provided by a delay line which delays the field scan signal for the first field scan of a frame. The resulting video signal is retimed so the picture information containing portions are separated by the normal field blanking interval. The retiming can be accomplished by the same delay line used to provide the double blanking interval, via electronic switching which alternately switches the delay line into the outputs of a field scan generator and a video processor.

11 Claims, 5 Drawing Figures

FLYING SPOT FILM SCANNER PROVIDING INCREASED TIME FOR FILM PULL-DOWN

This invention relates to a flying spot scanner for producing a television video signal from a motion picture film.

Such scanners are well known and comprise a cathode ray tube on the screen of which an unmodulated raster is produced by an extremely small and very brilliant spot of light. The light from the tube is focussed on to the film and thus as the spot on the cathode ray tube moves across the screen the image of the spot scans film. The light passing through the film is modulated by the latter and, in the case of a monochrome scanner, is directed to a photoelectric device which produces a video signal. In the case of a colour film scanner, the light is split into different primary colour components after passing through the film and each component is directed to a respective photoelectric device.

The flying spot method of film to video signal conversion is capable of producing a good quality picture, but nevertheless it suffers from a major disadvantage. This is the need to effect film pull-down within the television field blanking interval, which is approximately one millisecond. Several systems have been proposed to overcome this problem, with varying degrees of success, and the most well-known of these are as follows.

Firstly, there is the continuous motion twin lens system. The film runs continuously and the movement of the film provides approximately half the scanning movement required in the vertical direction; the remainder of the scanning movement is provided by the movement of the spot on the screen of the scanning tube. The changeover from one film frame to the next is effected by changing over from one lens to the other. Each film frame is scanned by two television fields and the film moves through the projector at twenty five frames per second. This system is satisfactory for television systems having fifty television fields per second, but is unsuitable for the American 525 line/60 field system.

Secondly, there is the polygon-type flying spot scanner. In this scanner a rotating polygon is used to effectively immobilise the motion of a continuously moving film. This method can be employed with all television systems, but there are a number of difficulties due to the close tolerances required from the optical components and also due to glare caused by the large number of glass to air surfaces involved.

Thirdly, various types of fast pull down intermittent motion scanners have been made, but not have been entirely satisfactory owing to the large forces imposed on the film. Probably the best fast pull down projectors are those employing pneumatic pull-down, but even these are hardly satisfactory. The period of one millisecond is just too short a period of time to allow satisfactory pull down of 16 mm film.

The purpose of the invention is to provide a scanner in which a period longer than a single field blanking interval is available for film pull-down.

According to the invention there is provided an intermittent motion flying spot film scanner in which film pull-down is effected during a period of time between successive field scans which is greater than the field blanking interval, such period being provided by delaying, or delaying the production of, the first field scan of each frame by an amount no greater than the field blanking interval.

Embodiments of the invention will now be described, by way of example, with reference to the accompanying drawings, in which.

The invention relies on the fact that at least two television fields occur for each film frame. In the European 50 field system each film frame is scanned by two television fields. When using the American 60 field system the film moves at twenty four film frames per second and film frames are scanned alternately by three and two television fields so that two film frames occupy the same time as five television fields. If, therefore, the first field scan of a frame is delayed by up to one field blanking interval, a much greater period is available for film pull-down.

Figure 1:
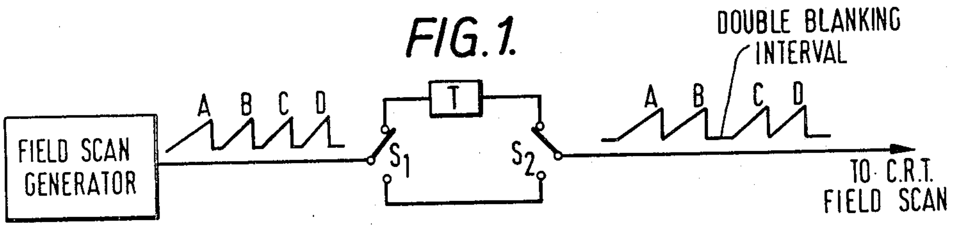
FIGS. 1 and 2 illustrate a first embodiment of the invention.

FIG. 1 illustrates a first arrangement for achieving this which is applicable to the 625 line/50 field television system. A field scan generator produces a conventional sawtooth scanning waveform for application to the cathode ray tube of the flying spot scanner. The individual field scans A to D are equally spaced by the usual blanking interval of approximately 1 millisecond. The output of the field scan generator is connected to the moving contact of a two-way switch $S_1$ whose fixed contacts are connected respectively to the input of a delay line T and directly to one fixed contact of a second two-way switch $S_2$. The other fixed contact of the switch $S_2$ is connected to the output of the delay line T, and the movable contact of the switch $S_2$ goes to the field scan circuit of the cathode ray tube. It is to be appreciated that electronic rather than mechanical switches will be used in practice. The amount of delay introduced by the delay line T, which can be a conventional quartz delay line, is no greater than the conventional field blanking interval, and is preferably very slightly less than this interval. The switches $S_1$ and $S_2$ switch simultaneously at field frequency immediately preceding each field scan produced by the field scan generator, i.e. at the end of the conventional field blanking interval.

The operation of the circuit is as follows. Assume that both switches $S_1$ and $S_2$ are UP, i.e. making contact with their respective upper fixed contacts, at the beginning of the field scan A from the generator. The field scan A thus passes through the delay line T and on to the cathode ray tube, if necessary through an amplifier, with a delay equal to a single field blanking interval. Now both the switches $S_1$ and $S_2$ are switched DOWN and the next field scan B passes directly to the switch $S_2$ without delay and therefore immediately follows the field scan A to the cathode ray tube without the usual field blanking interval. The switches $S_1$ and $S_2$ are next moved UP immediately preceding the field scan C. The field scan C therefore passes through the delay line T and arrives at the switch $S_2$ two field blanking intervals later than the end of field scan B, this double blanking interval being composed of the original field blanking interval and the delay introduced by the delay line T. The next field scan D follows immediately upon field scan C to the cathode ray tube in the same way as field scan B followed field scan A, the switches $S_1$ and $S_2$ having been switched DOWN. Thus the effect of the circuits is to displace alternate ones of the original equally spaced field scans by one field blanking interval resulting in a waveform which consists of groups of two immediately adjacent field scans separated by a double field blanking interval.

The advantage of this is clear. The flying spot scanner now has a period equal to twice the conventional field blanking interval, i.e. approximately 2 milliseconds, in which film pull-down can be effected, each frame of the film being scanned twice in succession without the conventional field blanking interval by a group of two immediately adjacent fields. The availability of a longer period for film pull-down imposes less constraints upon the design of the pull-down mechanism and results in less wear and tear on the film. Details of the flying spot scanner itself are not given since this can be entirely conventional, except of course that the pull-down mechanism can be designed to take advantage of the longer period available for film pull-down.

It is clear that since the original field scan waveform is modified prior to application to the scanner cathode ray tube, the video signal derived from the scanner will be similarly modifed. Thus it is necessary to retime the output video signal into the standard form in which the portions of the video signal corresponding to the field scan applied to the cathode ray tube, i.e. those portions actually containing picture information, are separated from one another once again by the constant field blanking interval. Thic can be achieved with a circuit analogous to that of FIG. 1, and such a circuit is shown in FIG. 2.

Figure 2:
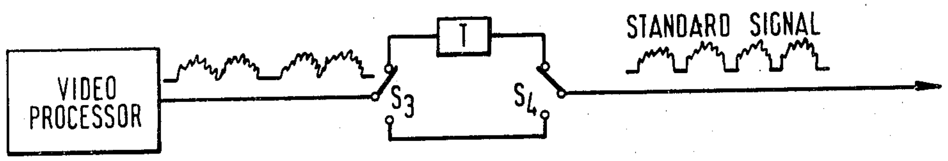

On the left of FIG. 2 is shown the video processor at whose ouptut appears the video signal derived from the scanning of the film by the flying spot produced upon the screen of the cathode ray tube. The output of the video processor is connected to an arrangement of two-way switches $S_3$ and $S_4$ and a delay line T identical to the arrangement of switches $S_1$ and $S_2$ and delay line T of FIG. 1. The switches $S_3$ and $S_4$ change over at the same time as the switches $S_1$ and $S_2$ , but when the switches $S_1$ and $S_2$ are UP, the switches $S_3$ and $S_4$ are DOWN, and vice versa. The effect of this is that in the output video signal the second field in each immediately adjacent pair is displaced by one field blanking interval so returning the video signal into the standard form.

Figure 3:
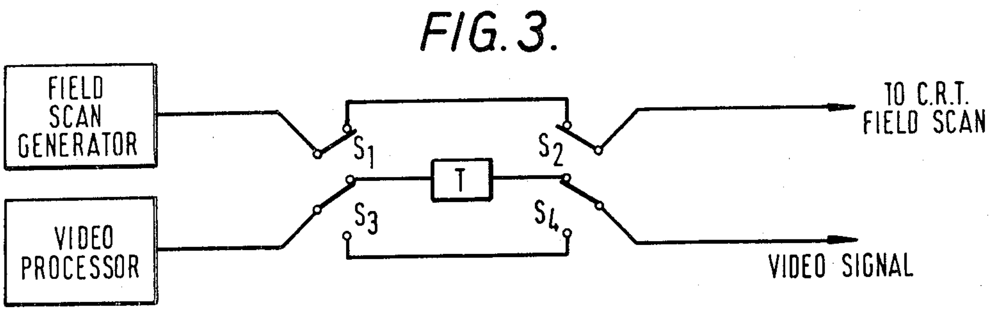
FIG. 3 illustrates a second embodiment of the invention.

It is clear from the discussion above in relation to FIGS. 1 and 2 that the delay line T of FIG. 1 is switched into circuit for for alternate fields relative to the delay line of FIG. 2. This suggests that a single delay line could be used in place of the two delay lines of FIGS. 1 and 2, and FIG. 3 shows how this can be done. The upper part of FIG. 3 corresponds to the circuit of FIG. 1 and the lower part to the circuit of FIG. 2, the delay line T being common to both.

Figure 4:
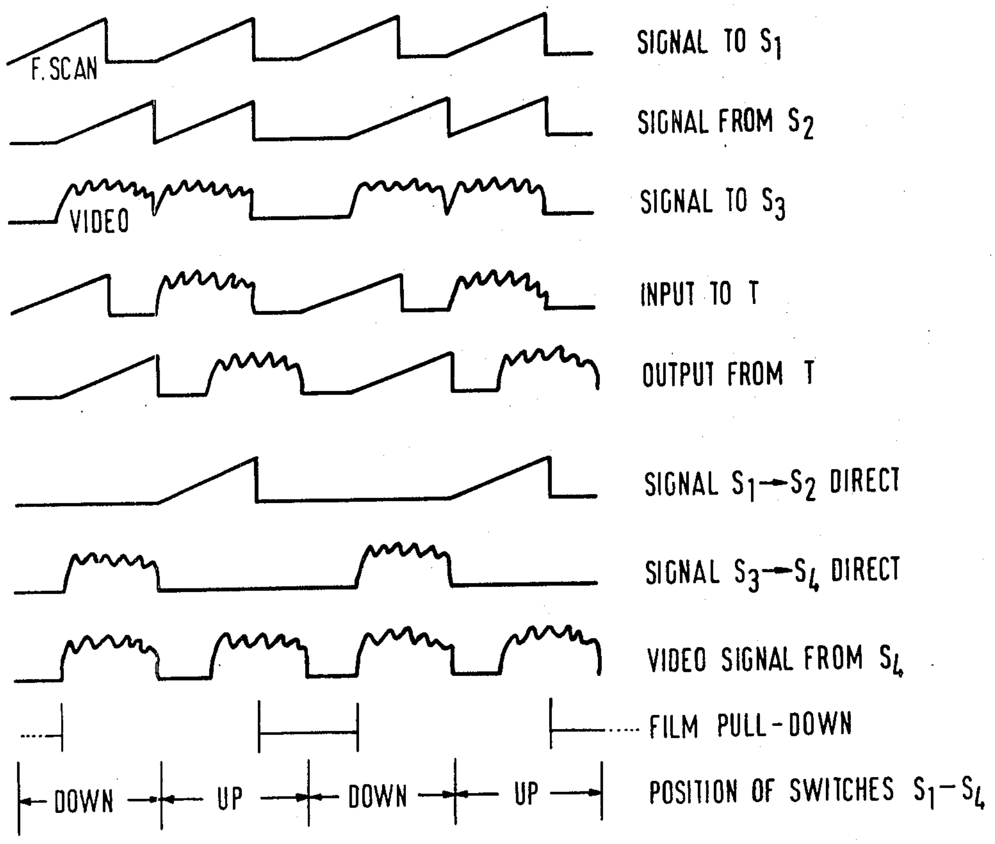
FIG. 4 is a timing diagram showing how to operate the embodiment of FIG. 3 for the 625/50 television system.

The operation of FIG. 3 is in principle indentical to that of FIGS. 1 and 2. Again, all four switches change over simultaneously, but it is to be noted that since in the upper part of FIG. 3 the vertical positions of the direct connection between $S_1$ and $S_2$ and the delay line T have been reversed compared to their positions in FIG. 1, all the switches are UP together and all are DOWN together. The timing diagram for the operation of FIG. 3 is shown in FIG. 4 for the 625/50 system. This arrangement has the great advantage that it is unnecessary to match accurately two delay circuits.

Figure 5:
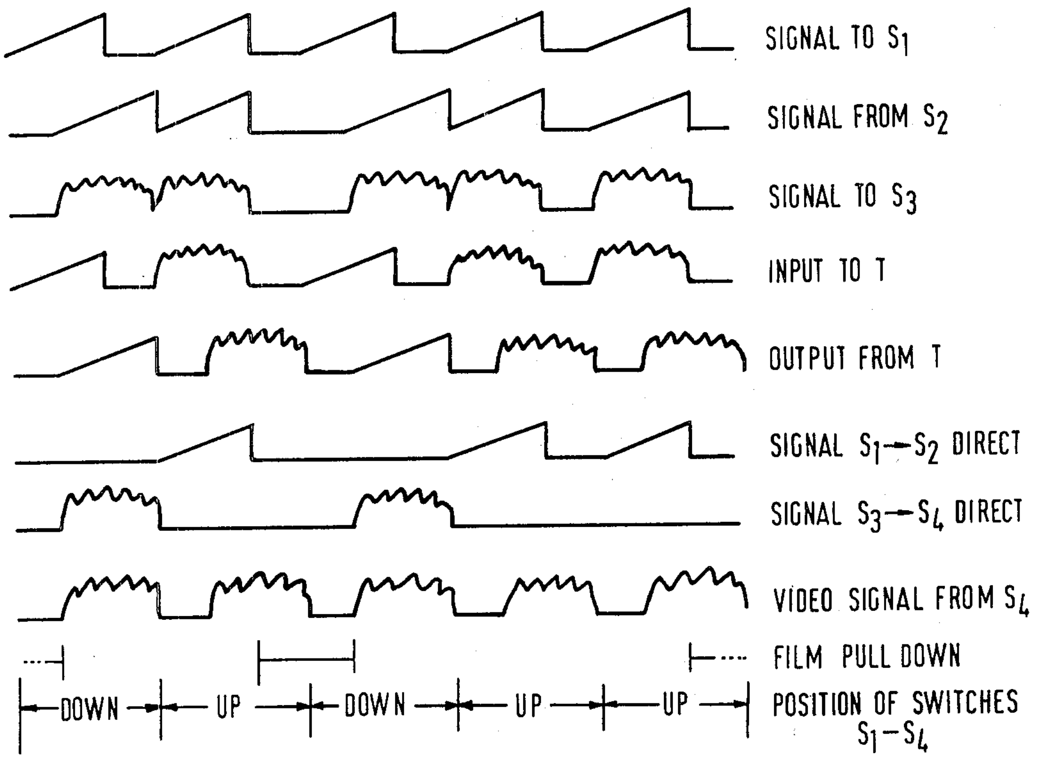
FIG. 5 is a timing diagram illustrating how the embodiment of FIG. 3 is operated for the 525/60 system.

So far the operation of the embodiments of the invention described above has only been given for the 625 line/50 field system. FIG. 5 is a timing diagram for the operation of the circuit of FIG. 3 when the 525 line/60 field system is used.

It should be appreciated that although the specific embodiments have only dealt with monochrome flying spot scanners, the invention is equally applicable to colour film scanners. In such a case a separate circuit similar to FIG. 2 could be used for the video signal corresponding to each colour components. A preferred arrangement for colour film scanners however is again that of FIG. 3, but where the signal passed through switches $S_3$ and $S_4$ is the encoded colour signal derived from the individual video signals. The encoded colour signal may be in N.T.S.C., P.A.L., or any other know form of colour encoding. It should also be appreciated that the field synchronising pulses which initiate each field scan can be passed through the delay circuit rather than the field scan itself.

The system described above has the advantage of employing only a single delay of approximately one millisecond and this delay remains a circuit for the whole of a television field. This latter feature precludes the possibility of there being a colour difference between separate parts of one field.

We claim:

1. In a flying spot film scanner, the combination of intermittent motion film pull-down means for pulling film down during a period of time between successive field scans which is longer than the field blanking interval and substantially shorter than a field interval, and means for providing said longer period by delaying the first field scan of each film frame by an amount no greater than a field blanking interval.

2. A flying spot film scanner according to claim 1, in which the means for delaying the first field scan of each film frame comprises means for delaying corresponding ones of a series of field frequency signals which initiate said field scans.

3. A flying spot film scanner comprising an intermittent motion film pull-down mechanism, a cathode ray tube for producing a raster for scanning the film a plurality of times per second, means for generating a field scan waveform to control the cathode ray tube, means for delaying the first field scan of each film frame by no more than one field blanking interval, whereby an extended interval greater than a single field blanking interval is produced between each said first field scan and the preceding field scan during which extended interval the film pull-down mechanism is arranged to operate, and means to retime a picture information bearing signal derived from the scanning into a form in which the portions of the signal corresponding to the field scans applied to the cathode ray tube are separated by the field blanking interval.

4. A flying spot film scanner according to claim 3, in which the means for delaying the first field scan of each film frame comprises means for delaying corresponding ones of a series of field frequency signals which initiate said field scans.

5. A flying spot film scanner according to claim 3, in which the picture information bearing signal is a video signal resulting from the scanning.

6. A flying spot film scanner according to claim 3, in which the picture information bearing signal is an encoded colour television signal.

7. A flying spot film scanner according to claim 3, in which the retiming means comprises means for delaying those portions of the picture information bearing signal corresponding to all but the first field scans by an amount equal to the delay of the latter.

8. A flying spot film scanner according to claim 7, in which means for delaying the first field scan of each film frame and the means for delaying the said portions of the picture information bearing signal comprise a single delay line.

9. A flying spot film scanner according to claim 4, in which the retiming means comprises means for delaying those portions of the picture information bearing signal corresponding to all but the first field scans by an amount equal to the delay of the latter.

10. A flying spot film scanner according to claim 9, in which the means for delaying the first field scan of each film frame and the means for delaying the said portions of the picture information bearing signal comprise a single delay line.

11. A method of producing a television video signal from a motion pciture film comprising the steps of: scanning a first frame of the film with a flying spot scanner to produce first and second successive fields, said scanning including delaying the initiation of the first field scan by an amount not greater than a normal blanking interval between fields, and causing initiation of a second field scan during a time interval following the first scan which is less than a normal blanking interval, whereby the first and second fields are separated by a time interval shorter than the normal blanking interval, scanning a second frame of the film with the flying spot scanner to produce first and second fields, said scanning of the second frame including delaying the initiation of the first field scan of the second frame by an amount not greater than a normal blanking interval, and causing initiation of the second field scan of the second frame during a time interval following the first frame which is less than a normal blanking interval, so that there is a time interval between the second field scan of the first frame and the first field scan of the second frame which is no longer than a normal blanking interval, moving the film one frame during the longer time interval between the second field scan of the first frame and the first field scan of the second frame, and retiming picture information derived from the scanning so that signals corresponding to the field scans are separated by the normal field blanking interval.

* * * * *